United States Patent
Ota et al.

(10) Patent No.: US 7,430,205 B2
(45) Date of Patent: Sep. 30, 2008

(54) PACKET TRANSFER APPARATUS

(75) Inventors: Migaku Ota, Yokohama (JP); Hiroaki Miyata, Yokohama (JP); Jun Nakajima, Yokohama (JP); Yoshitaka Sakamoto, Yokohama (JP)

(73) Assignee: Hitachi Communication Technologies, Ltd., Tokyo (JP)

(*) Notice: Subject to any disclaimer, the term of this patent is extended or adjusted under 35 U.S.C. 154(b) by 827 days.

(21) Appl. No.: 11/033,386

(22) Filed: Jan. 12, 2005

(65) Prior Publication Data
US 2005/0207411 A1    Sep. 22, 2005

(30) Foreign Application Priority Data
Mar. 22, 2004    (JP) .............................. 2004-082401

(51) Int. Cl.
H04L 12/56    (2006.01)
H04J 3/16     (2006.01)
H04J 3/22     (2006.01)

(52) U.S. Cl. .................. 370/393; 370/394; 370/395.21; 370/419; 370/469

(58) Field of Classification Search ................ 370/389, 370/235, 393, 395.21, 401, 409, 420, 469
See application file for complete search history.

(56) References Cited

U.S. PATENT DOCUMENTS

2003/0174715 A1* 9/2003 Yazaki ....................... 370/397
2003/0177395 A1* 9/2003 Pardee et al. ................ 713/201
2005/0207411 A1* 9/2005 Ota et al. ..................... 370/389

FOREIGN PATENT DOCUMENTS

JP    2000-253058    9/2000
JP    2003-198591    7/2003

* cited by examiner

Primary Examiner—Seema S. Rao
Assistant Examiner—Jianye Wu
(74) Attorney, Agent, or Firm—Mattingly, Stanger, Malur & Brundidge, P.C.

(57) ABSTRACT

A packet transfer apparatus which can switch a communication path for each of a plurality of users using the same L2TP tunnel is provided. Packet transfer apparatuses terminating L2TP contain a table specifying a flow threshold level and a priority level of each subscriber; the amount of packet flow of each subscriber is measured in accordance with the information in the table; if the threshold level is exceeded, the packet communication path is switched in accordance with the priority level specified for each subscriber. The OSPF protocol is used to manage the path information, and the information of a plurality of paths to a destination is stored in a path management table. The path is switched by specifying destination routers with the source routing option in the IP header of a packet after L2TP encapsulation.

7 Claims, 18 Drawing Sheets

| PPPoE SESSION ID /1211 | CONNECTION-DESTINATION LNS ADDRESS /1212 | FLOW THRESHOLD LEVEL /1213 | PRIORITY LEVEL /1214 |
|---|---|---|---|
| 1 | 192.168.0.1 | 1Mbit/s | 1 |
| 2 | 192.168.0.1 | 2Mbit/s | 3 |
| ... | ... | ... | ... |
| n | 192.168.0.1 | 1Mbit/s | 2 |
|  |  |  |  |
|  |  |  |  |
|  |  |  |  |

Fig. 11

| PRE-CAPSULATION DA /1221 | CONNECTION-DESTINATION LAC ADDRESS /1222 | FLOW THRESHOLD LEVEL /1223 | PRIORITY LEVEL /1224 |
|---|---|---|---|
| 215.10.10.1 | 192.168.128.1 | 1Mbit/s | 1 |
| 215.10.10.2 | 192.168.128.1 | 2Mbit/s | 3 |
| ... | ... | ... | ... |
| 215.10.10.n | 192.168.128.1 | 1Mbit/s | 2 |

Fig. 12

| DA | DEFAULT PATH | PATH NUMBER | METRIC | OUTPUT CHANNEL INFORMATION | ROUTER #1 | ROUTER #2 | ROUTER #3 | ROUTER #4 | ... |
|---|---|---|---|---|---|---|---|---|---|
| 192.168.0.1/24 | | 1 | 1200 | IF:5,Port3 | 192.168.1.1 | 192.168.2.1 | 192.168.3.1 | | |
| | | 2 | 30 | IF:2,Port1 | 192.168.4.2 | 192.168.5.2 | | | |
| | O | 3 | 700 | IF:3,Port2 | 192.168.6.3 | 192.168.7.2 | | | |
| 192.168.20.1/28 | O | 1 | ... | ... | ... | ... | ... | ... | ... |
| | | ... | ... | ... | ... | ... | ... | ... | ... |
| | | n | ... | ... | ... | ... | ... | ... | ... |
| ... | ... | ... | ... | ... | ... | ... | ... | ... | ... |

Fig. 13

| USER ID | PASSWORD | CONNECTION-DESTINATION LNS ADDRESS | FLOW THRESHOLD LEVEL | PRIORITY LEVEL |
|---|---|---|---|---|
| xxxx@ISP1 | pass-xxxx | 192.168.0.1 | 1Mbit/s | 1 |
| yyyy@ISP1 | pass-yyyy | 192.168.0.1 | 2Mbit/s | 3 |
| zzzz@ISP1 | pass-zzzz | 192.168.0.1 | 1Mbit/s | 2 |
| aaaa@ISP2 | pass-tttt | 192.168.0.2 | 0.5Mbit/s | 1 |

Fig. 14

PACKET TRANSFER APPARATUS

BACKGROUND OF THE INVENTION

1. Field of the Invention

The present invention relates to packet transfer apparatuses, and more specifically, to a packet transfer apparatus which terminates Layer 2 Tunneling Protocol (L2TP) at a subscriber side or at an Internet service provider (ISP) side.

2. Description of the Related Art

One known method uses Point-to-Point Protocol (PPP) to authenticate a subscriber as a user when a subscriber terminal is connected via an ISP to the Internet.

PPP is a protocol for making a one-to-one connection between a subscriber terminal and an ISP access point. PPP was originally used in an environment where a terminal is connected directly to an ISP access point by dialup connection through a phone line, authenticated, and then connected to the Internet.

As continuous access to the Internet has become common, the connection between the subscriber terminal and the ISP server is currently made through an access carrier network (access network NW1) utilizing Internet Protocol (IP), besides the telephone network. Because access network NW1 is formed in layer 3 of the OSI model, a means for transferring a PPP packet to an ISP-side PPP terminating apparatus is required to perform PPP authentication through access network NW1. One such transfer means is L2TP.

L2TP is a technology used to encapsulate a PPP packet into an IP packet. This protocol establishes a virtual communication path by generating a virtual tunnel on a public telecommunications network and making a PPP connection in the tunnel.

Generally, PPP for making a dialup connection by phone line is used to make a connection to a remote party (ISP in this specification). This connection, however, requires the establishment of a virtual channel (tunnel) between the local network and the remote network, over the public network. L2TP is used to establish the tunnel.

The L2TP tunnel allows PPP to be terminated at an ISP-side exit from access network NW1 although PPP is conventionally terminated at a host-side entry to access network NW1 (this will be described later in further detail, with reference to FIG. 3).

The logical private channel is referred to as an L2TP connection, an L2TP tunnel, and an L2TP session. The L2TP connection is made by a subscriber-side L2TP terminating apparatus (LAC) and an ISP-side L2TP terminating apparatus (LNS). Via the L2TP connection, a PPP packet is transferred to LNS (2), which terminates both L2TP and PPP on the ISP side.

Further details will be described next with reference to a figure.

FIG. 3 shows the configuration of a conventional communication system.

A plurality of communication terminals (hosts) H-1 to H-n and h-1 to h-n are connected to access network NW1 and then via ISP networks NW2 to Internet NW3. A variety of services are available through this connection.

Access network NW1 can serve a variety of ISPs. One example of the access network is a local IP network of Nippon Telegraph and Telephone Corporation (Japan). Each of ISP networks NW2 is managed by an ISP.

The shown system has two LACs and two ISPs. Each host accesses Internet NW3 under a subscription to a related ISP.

When a logical private channel is established in access network NW1, tunnel T1 is established between LAC1 used by host H-1 and LNS1 managed by the ISP which host H-1 subscribes to. The figure shows that host H-n uses the same tunnel.

Like host H-1, host H-m uses LAC1 as an access point. However, hosts H-m and H-1 subscribe to different ISPs. Accordingly, tunnel T2 is formed to LNS2 managed by the corresponding ISP.

LAC and LNS make it possible to provide a virtual path that functions like a private channel across access network NW1 to an ISP.

The tunnel will be described next in further detail.

FIG. 4 shows a plurality of hosts connected through an ISP to Internet NW3.

When a host accesses Internet NW3, LAC (1) and LNS (2) form tunnel T1 across access network NW1 to ISP network NW2, in the same way as shown in FIG. 3.

Logical tunnel T1 contains seven physical routers R1 to R7 to route data between LAC (1) and LNS (2). Not all of these routers are exclusively allocated to tunnel T1, and some of the routers may also be used in another tunnel. A tunnel is just a logical communication channel. For instance, if access network NW1 contains physical routers R1 to R50 and provides a plurality of tunnels T1 to Tn, routers R1, R4, R6, R45, R50 and others may be used physically in tunnel T2, routers R1, R6, R30, R37, R41, and others may be used physically in tunnel T3, and routers R2, R3, R21, R27, and others may be used physically in tunnel Tn.

FIG. 4 shows that logical tunnel T1 has three physical paths 1, 2, and 3 between LAC (1) and LNS (2). Path 1 passes routers R1, R2, and R3; path 2 passes routers R4 and R5; path 3 passes through routers R6 and R7.

With the technologies disclosed in Japanese Unexamined Patent Application Publication No. 2000-253058 and Japanese Unexamined Patent Application Publication No. 2003-198591, just the optimum path, P2 in this case, will be used for data communication unless another path is specified beforehand. The other paths will not be used even if they have available line capacity.

The reason will be described next with reference to a figure.

FIG. 7 shows packet formats used in the configuration shown in FIG. 3.

Packets are transferred in packet format 7-PK3 between a host and LAC, in packet format 7-PK2 between LAC and LNS, and in packet format 7-PK1 between LNS and NW3.

In this configuration, routers and other network apparatuses of hosts H-1, H-2, and H-n, ISP network NW2, and Internet NW3 are managed by their global IP addresses while apparatuses in access network NW1 are managed by their private IP addresses. Routers R1 to R7 in NW1 and the terminating positions of the L2TP tunnel are managed by their private IP addresses. The private IP address of LAC is 192.168.128.1, and the private IP address of LNS is 192.168.0.1.

Packet format 7-PK3 contains a global IP address in the IP2 field of the IP header. When the packet is sent from LAC (1) to access network NW1, the IP1 field containing a private IP address is added to the IP header as a result of L2TP encapsulation.

The source address (SA) in the IP1 field is the IP address of LAC (1) terminating L2TP tunnel T1, or 192.168.128.1. The destination address (DA) in the IP1 field is the IP address of LNS (2) terminating L2TP tunnel T1, or 192.168.0.1.

Accordingly, when host H-1, H-2, or H-n accesses NW2 and NW3 through L2TP tunnel T1, DA is always 192.168.0.1 and SA is always 192.168.128.1 in the IP1 header, regardless of the target IP apparatuses in NW2 and NW3.

LAC and LNS select one optimum upstream transfer path and one optimum downstream transfer path respectively, in accordance with DA in the IP header. Packets are transferred just in the selected path.

With the disclosed technologies, the data of a plurality of users served by a single L2TP tunnel will be transferred through a common physical path (P2 in FIG. 4). The other paths (P1 and P3 in FIG. 4) will not be used.

SUMMARY OF THE INVENTION

With the conventional technologies described above, the packets of a plurality of users served by the same L2TP tunnel are transferred in the same path because the L2TP-encapsulated packets have the same DA and the same SA. If one heavy user occupies the frequency band of an L2TP channel (path P2 in FIG. 4, for instance), the other users should suffer from increased packet loss probability.

Accordingly, it is an object of the present invention to provide a packet transfer apparatus that allows physical paths in a logical tunnel to be selected for a plurality of users using the same logical tunnel in access network NW1 on an individual basis.

According to the solving means of the present invention, there is provided.

A packet transfer apparatus for serving a plurality of communication terminals having IP addresses and for connecting the communication terminals through a Layer 2 Tunneling Protocol (L2TP) network to the Internet, the packet transfer apparatus comprising:

a protocol processing block for specifying a priority policy for associating a priority level with a path selection method and for selecting one of a plurality of physical paths formed by a plurality of routers in the L2TP network;

a plurality of channel interfaces for transferring a received packet to the protocol processing block and for sending the packet received from the protocol processing block in a communication protocol used on an input/output channel;

a switch for transferring the packet received from the protocol processing block to another protocol processing block connected to the channel interface containing an output port having a given address;

a user information table for specifying a destination address of an L2TP tunnel and an L2TP session, a flow threshold level, and a priority level, in correspondence with a user ID of a user using a communication terminal; and a path management table for storing a path identifier of each path to a destination subnet address, addresses of routers included in each path, and a metric value representing the proximity to a destination subnet or the transfer rate of each path;

wherein the protocol processing block creates a user management table storing the destination addresses of the L2TP tunnels and the L2TP sessions, the flow threshold levels, and the priority levels of the users defined in the user information table, in correspondence with identifiers for identifying the individual users, when the L2TP tunnel and the L2TP session are established;

detects the amount of packet flow of each user in accordance with the identifier for identifying the user at the reception of a packet from the channel interface, and compares the amount of packet flow with the flow threshold level defined in the user management table;

selects a transfer path in accordance with a priority policy for switching a default path to another path having a different metric value, depending on the priority level, with reference to paths defined for the corresponding destination subnet address in the path management table, if the amount of packet flow exceeds the flow threshold level; and adds a source routing option for specifying addresses of routers to be passed, as indicated in the path management table, to the data received from the communication terminal, performs L2TP encapsulation for adding a header used in the L2TP tunnel, and switches a physical path by specifying destination routers.

The present invention makes it possible to select a communication path for each of a plurality of users using the same tunnel. Even if the amount of packet flow of a subscriber extremely increases, the present invention can decrease the packet loss probabilities of the other users through effective use of the network and can save the packets of the heavy user.

BRIEF DESCRIPTION OF THE DRAWINGS

FIG. 11 is a view showing an example LAC user management table.

FIG. 12 is a view showing an example LNS user management table.

FIG. 13 is a view showing an example path management table.

FIG. 14 is a view showing an example user information table.

DESCRIPTION OF THE PREFERRED EMBODIMENTS

1. Communications System

Figure 1:
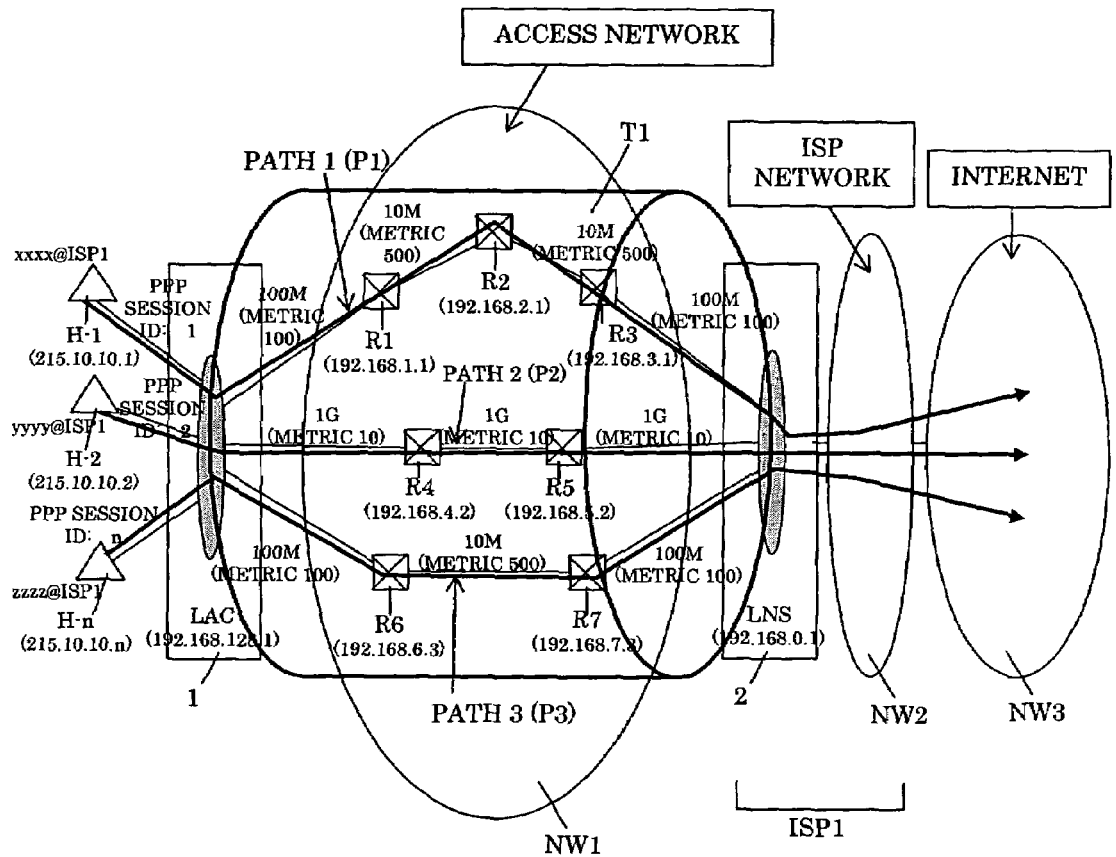
FIG. 1 is a view showing the configuration of a communication system of a first embodiment.

FIG. 1 shows the configuration of a communication system of a first embodiment.

The figure shows that hosts H-1, H-2, and H-n access Internet NW3 through access network NW1 and ISP network NW2. First, host H-1, H-2, or H-n accesses Internet service provider ISP1 which the host subscribes to, and gets authenticated as a user. The communication carrier and ISP1 allow LNS (2) and LAC (1), which is a user-side terminating apparatus, to form L2TP tunnel T1 in access network NW1 and LNS (2) to perform user authentication and others.

An IP address management system in this network will be described next.

Hosts H-1, H-2, and H-n, routers in ISP network NW2, and network apparatuses in Internet NW3 are managed by their global IP addresses. For instance, host H-1 is assigned a global IP address 215.10.10.1.

Apparatuses in access network NW1 are managed by their private IP addresses. For instance, router R1 is assigned a private IP address 192.168.1.1, and LAC (1) and LNS (2) terminating L2TP tunnel T1 are assigned private IP addresses 192.168.128.1 and 192.168.0.1 respectively.

Hosts H-1, H-2, and H-n are ISP1 subscriber terminals and use user IDs xxxx@ISP1, yyyy@ISP1, and zzzz@ISP1 respectively. ISP network NW2 is a network managed by ISP1.

Host H-1 can access ISP network NW2 and Internet NW3 through access network NW1. However, NW1 uses private IP addresses, and NW2 and NW3 use global IP addresses, as described above. In spite of the difference in address management system, communication through NW1 is enabled by L2TP tunnel T1 and IP encapsulation.

Specific steps to be followed before host H-1 can access Internet NW3 will be described next.

When host H-1 starts a PPP session to access the Internet, LAC (1) receives a PPP packet from host H-1 and determines the address of a destination LNS (2) to which a tunnel is formed, with reference to tables such as a user information table, in accordance with the user ID of host H-1. LAC (1) then forms L2TP tunnel T1 to LNS (2) and starts establishing an L2TP session through tunnel T1.

At reception of a request for forming the L2TP tunnel and starting an L2TP session from LAC (1), LNS (2) performs user authentication, using a user ID such as xxxx@ISP1 and a password included in the received packet. When the authentication is successfully completed, LNS (2) forms an L2TP tunnel and establishes an L2TP session with LAC (1). Now, host H-1 is allowed to access Internet NW3.

Figure 2:
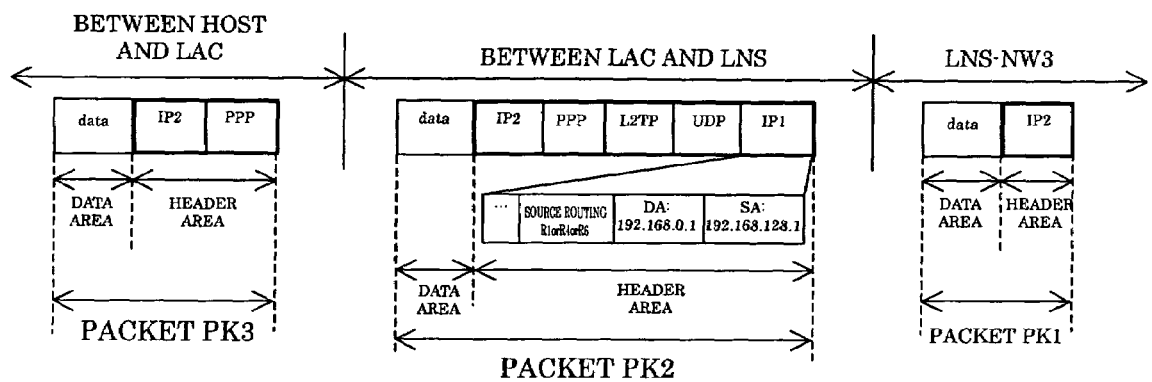
FIG. 2 is a view showing packet formats used in the configuration shown in FIG. 1.
Figure 3:
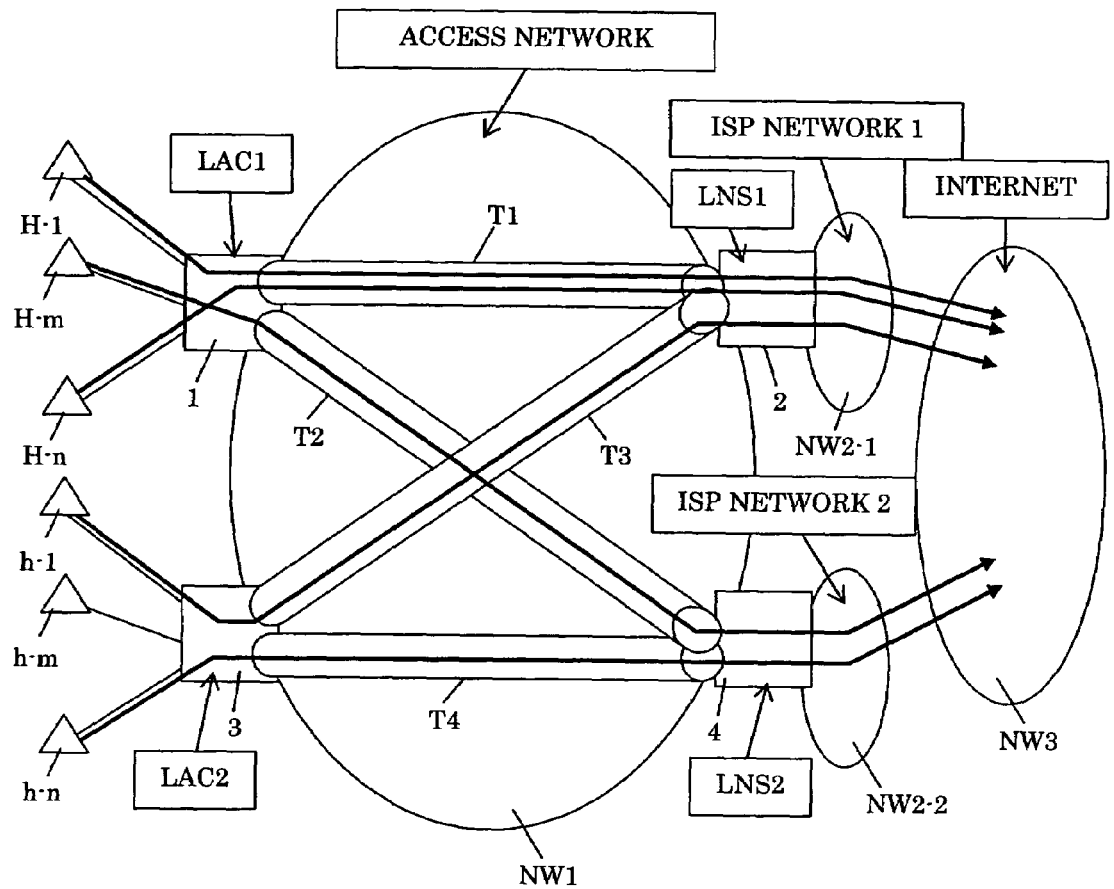
FIG. 3 is a view showing the configuration of a conventional communication system.
Figure 4:
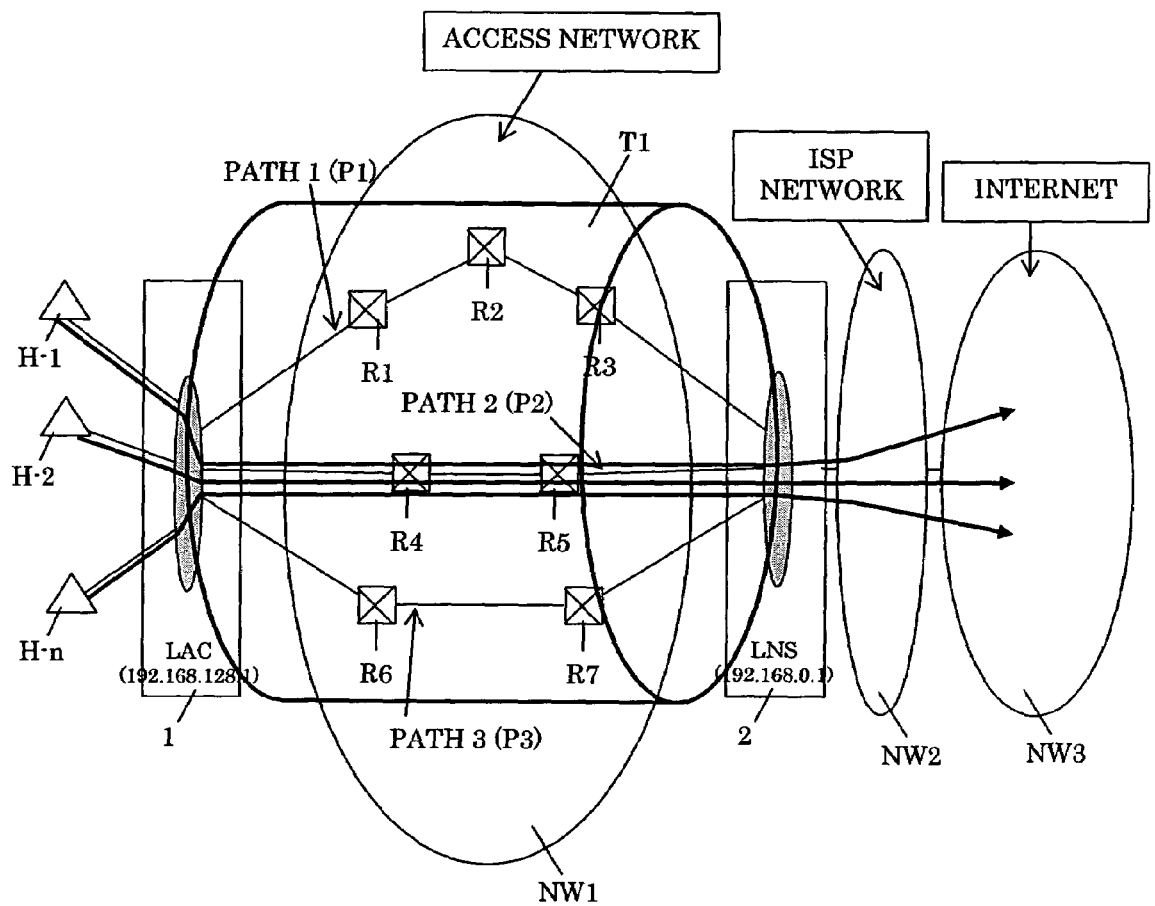
FIG. 4 is a view showing a plurality of hosts accessing the Internet, using the conventional technologies.

FIG. 2 shows packet formats used in the network configuration shown in FIG. 1.

Packets are transferred in packet format PK3 between a host and LAC, in packet format PK2 between LAC and LNS, and in packet format PK1 between LNS and Internet NW3. Each packet format has a data area and a header area. The IP2 field in the header area of packet formats PK3 and PK1 contains a global IP address.

The IP1 field in the IP header area of packet format PK2 contains private IP addresses used in access network NW1.

SA and DA in the IP1 field added to packet format PK2 are the IP addresses of LNS (2) and LAC (1) terminating L2TP tunnel T1. The addresses are 192.168.0.1 and 192.168.128.1 in this configuration. When host H-1, H-2, or H-n accesses NW2 and NW3 through L2TP tunnel T1, DA and SA in the IP1 header field of a packet sent from the host are always the same (192.168.128.1 and 192.168.0.1 in this configuration), irrespective of the IP apparatuses to be connected on NW2 or NW3.

An object of the present embodiment is to allow a physical communication path in a logical tunnel between LAC (1) and LNS (2) in access network NW1 to be selected for each subscriber in accordance with the amount of packet flow sent from or received by the corresponding host using the logical tunnel.

In this embodiment, LAC (1) selects an upstream path (in the direction from a host to NW3), and LNS (2) selects a downstream path (in the direction from NW3 to a host), and the amount of packet flow of each subscriber is monitored, in comparison with the flow threshold level specified for the subscriber. If the threshold level is exceeded, the transfer path to be selected is determined in accordance with the priority level specified for the subscriber. The transfer path is switched accordingly when a source routing option is used to specify destination routers in the IP1 header field of packet format PK2, as shown in FIG. 2.

The source routing option is an option specified in the IP header. The option specifies the addresses of the routers to pass through when packets are transferred to a destination specified as DA in the IP header. There are two types of source routing options: Loose source routing allows packets to be routed through another router before the router specified in this option; Strict source routing specifies the addresses of all the routers to pass through and the order in which the routers are passed. The present embodiment can support either type of routing, depending on the path management table to be implemented.

2. Configuration of Packet Transfer Apparatus

The configuration of a packet transfer apparatus 1 of this embodiment will be described next in details.

Figure 8:
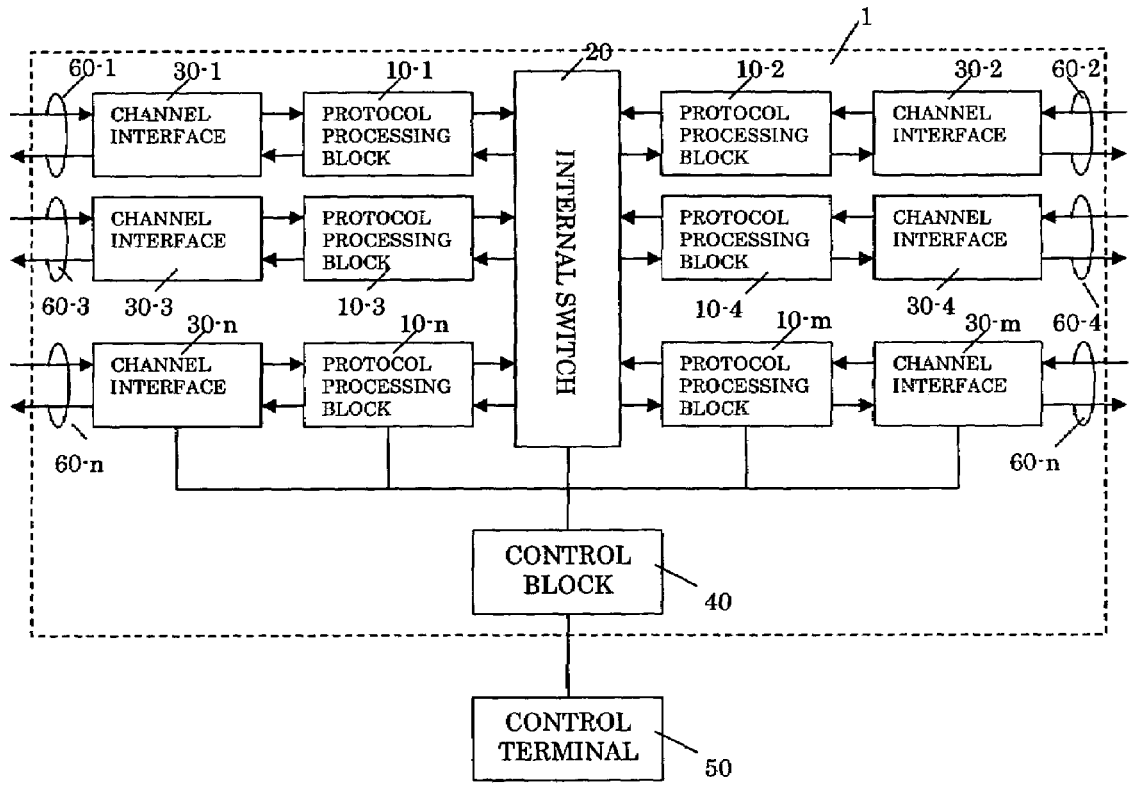
FIG. 8 is a view showing an example configuration of the packet transfer apparatus.

FIG. 8 shows the configuration of the packet transfer apparatus 1 (LAC or LNS) of this embodiment. The configuration of LAC (1) will be mainly described as an example. LNS has the same configuration.

The packet transfer apparatus 1 of this embodiment includes a plurality of physical input/output ports 60-i (i=1 to n: n is a natural number), a plurality of channel interfaces 30-i, a plurality of protocol processing blocks 10-i, an internal switch 20, and a control block 40 for controlling the internal switch, the protocol processing blocks, the channel interfaces, and other parts of the apparatus. The control block 40 has an interface (not shown) for enabling control by an external control terminal 50.

The channel interface 30-i regenerates an IP packet sent from an IP network such as ISP network NW2 or from a host, and transfers the packet to the protocol processing block 10-i. The channel interface 30-i also converts an IP packet output from the protocol processing block 10-i into a communication frame format complying with the communication protocol on the input/output channel, such as Ethernet (registered trademark) and ATM, and sends the converted packet to the IP network or the host.

Each time an IP packet is received from the channel interface 30-i, the protocol processing block 10-i checks the amount of packet flow of each subscriber, with reference to the point-to-point protocol over Ethernet (PPPoE: Registered trademark) session ID, if the apparatus is operating as LAC (1), or with reference to DA before L2TP encapsulation, if the apparatus is operating as LNS (2).

The internal switch 20 transfers the packet sent from the protocol processing block 10-i to another protocol processing block 10-i connected to the channel interface 30-i containing the input/output port 60-i having a specified address.

The control block 40 monitors the statuses of the protocol processing blocks 10-i and the internal switch 20, and reports the statuses in the node to the control terminal 50. The control block 40 also specifies control parameters of the protocol processing block 10-i, in response to an instruction given by the control terminal 50.

The control block 40 performs protocol processing which requires status monitoring, such as L2TP tunnel session connection processing, described later, and Open Shortest Path First (OSPF) communication, gives an instruction to rewrite the path management table, for instance, to the processor in the protocol processing block 10-$i$, and performs path management.

Figure 9:
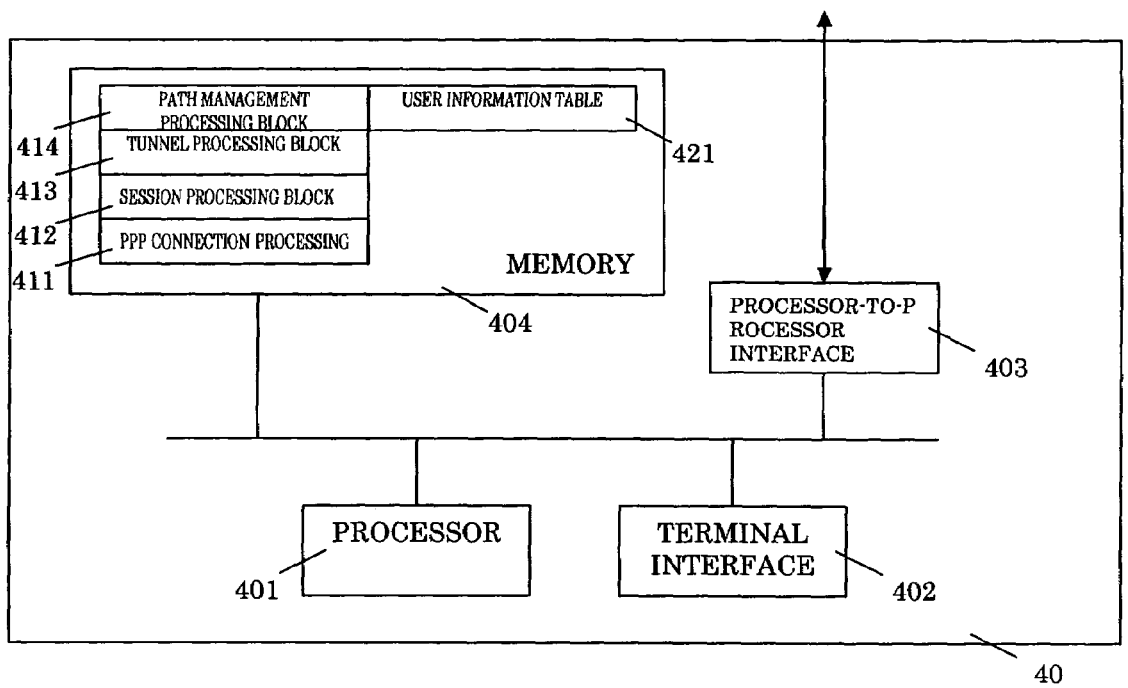
FIG. 9 is a view showing a control block in the packet transfer apparatus.

FIG. 9 shows the configuration of the control block 40.

The control block 40 includes a processor 401 for executing processing, a memory 404 for storing the contents of processing and a table used as a database, an interface 402 with the control terminal 50, and a processor-to-processor interface 403 used for communication with the protocol processing processor of the protocol processing block 10.

The memory 404 of the control block 40 has separate sub-blocks: a PPP connection processing block 411 for performing PPP processing and user authentication to allow a host to access Internet NW3, an L2TP tunnel processing block 413 for forming an L2TP tunnel and starting an L2TP session with LAC (1) or LNS (2), an L2TP session processing block 412, a path management processing block 414, and a user information table 421.

The path management processing block 414 exchanges path information with an adjacent router (R1, R4, or R6, for instance, if the apparatus is operating as LAC (1), as shown in FIG. 1) by OSPF. The whole path information including router addresses and metric values in access network NW1 is shared by OSPF routers in access network NW1. The path management processing block 414 gives an instruction to write, change, or delete the information of path to a transfer destination in the path management table of the protocol processing block 10-$i$, which will be described later, in accordance with the path information.

The metric value is a numeric value representing the proximity to a destination subnet and is assigned to each router channel by the network administrator, in consideration of the frequency band of the channel and others. In the configuration shown in FIG. 1, a metric value of 500 is assigned to a 10-Mbit/s channel, a metric value of 100 is assigned to a 100-Mbit/s channel, and a metric value of 10 is assigned to a 1-Gbit/s channel. A low metric value represents a high transfer rate.

FIG. 14 is a view showing an example of a user information table 421. The user information table 421 is a database containing the information specific to individual subscribers and is specified beforehand by the apparatus manager.

The table includes, for each user ID 4211 of a host, a user password 4212, a connection-destination LNS address 4213, a flow threshold level 4214 at which a physical path should be changed, and a user priority level 4215 to be checked when the physical path is changed.

When the packet transfer apparatus is operating as LAC (1), the table is used to obtain the destination LNS address (192.168.0.1, for instance) of an L2TP tunnel and an L2TP session from a user ID (xxxx@ISP1, for instance).

If the packet transfer apparatus is operating as LNS (2), user authentication is performed in accordance with the user ID 4211 and the password 4212 included in the table, and the host is allowed to access the Internet accordingly.

The priority level 4215 and the packet flow threshold level 4214 are determinant factors of the operation to switch the packet communication path. When an L2TP session is established, the flow threshold level 4214 and the priority level 4215 are incorporated as a flow threshold level 1213 in FIG. 11 or a flow threshold level 1223 in FIG. 12 and a priority level 1214 in FIG. 11 or a priority level 1224 in FIG. 12, in an LAC user management table 121 and an LNS user management table 122 of the protocol processing block 10-$i$, which will be described later.

Figure 10:
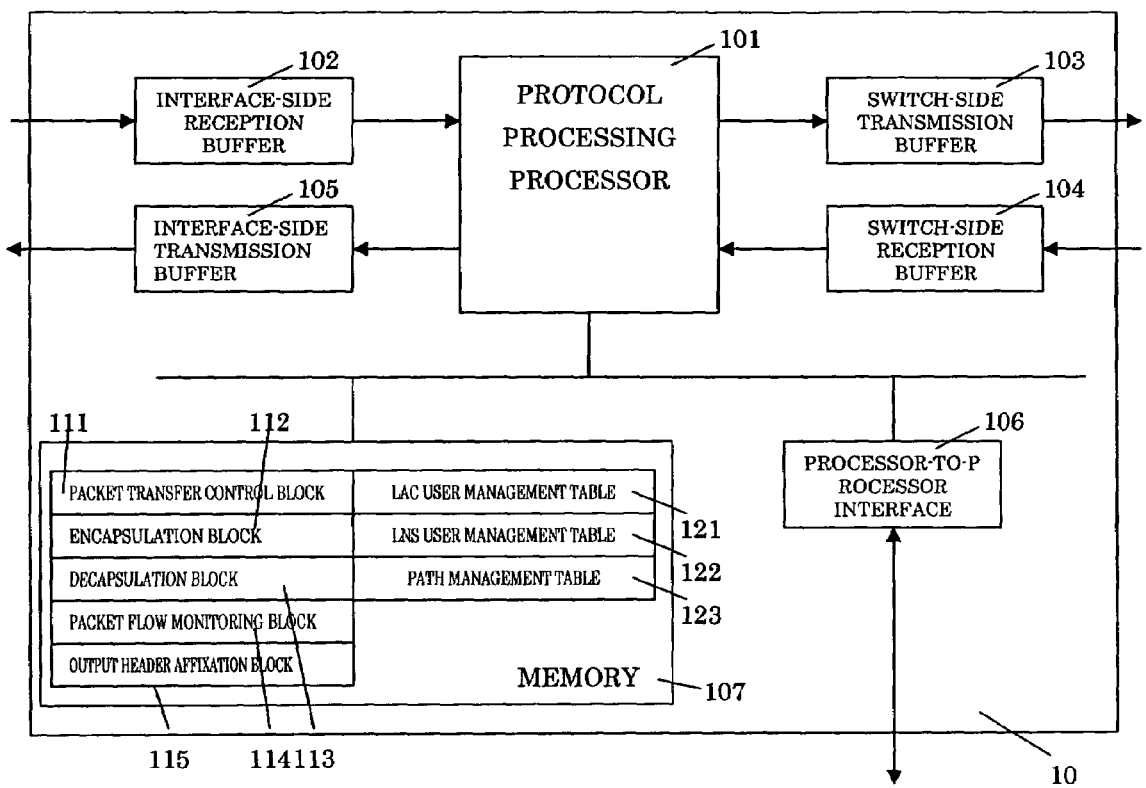
FIG. 10 is a view showing a protocol processing block in the packet transfer apparatus.

FIG. 10 shows the configuration of the protocol processing block 10.

The protocol processing block 10 includes an interface-side reception buffer 102, a protocol processing processor 101, a switch-side transmission buffer 103, a switch-side reception buffer 104, an interface-side transmission buffer 105, a processor-to-processor interface 106, and a memory 107. The interface-side reception buffer 102 receives a packet from the channel interface 30; the protocol processing processor 101 performs protocol processing; the switch-side transmission buffer 103 sends a packet to the internal switch; the switch-side reception buffer 104 receives a packet from the internal switch; the interface-side transmission buffer 105 sends a packet to the channel interface; and the processor-to-processor interface 106 is used for communication between the protocol processing processor 101 and the processor 403 of the control block.

The memory 107 has separate blocks for performing different processing: a packet flow monitoring block 114, a packet transfer control block 111, an L2TP encapsulation block 112, an L2TP decapsulation block 113, an output-header affixation block 115, the LAC user management table 121, the LNS user management table 122, and a path management table 123. The packet flow monitoring block 114 monitors the amount of packet flow of each subscriber and checks whether the flow threshold level given to the subscriber by the apparatus manager is exceeded. The packet transfer control block 111 determines the packet transfer path of each subscriber. The L2TP encapsulation block 112 affixes an L2TP header and implements IP encapsulation. The L2TP decapsulation block 113 deletes the L2TP-encapsulated header. The output-header affixation block 115 affixes a header in layer 2 of the OSI model when a packet is output from the present apparatus to the outside. The LAC user management table 121 and the LNS user management table 122 each contain the flow threshold level, the priority level, and other information of each subscriber. The path management table 123 contains the information of a transfer path to a destination subnet.

The present packet transfer apparatus is not always required to have both the LAC user management table 121 and the LNS user management table 122. The apparatus operating as LAC (1) is required to have the LAC user management table 121. The apparatus operating as LNS (2) is required to have the LNS user management table 122.

FIG. 11 is a view showing an example of the LAC user management table. The table contains a destination LNS address 1212 to which an L2TP tunnel and an L2TP session are connected and a flow threshold level 1213 and a priority level 1214 specified for each subscriber, in correspondence with a PPPoE session ID 1211 used to identify the subscriber in LAC.

The PPPoE session ID 1211 used to identify a subscriber in LAC (1) is an ID used to identify the subscriber in LAC (1) after an L2TP session is established. To be more specific, xxxx@ISP1 is an ID used to establish an L2TP session and is not a PPPoE session ID. If a host accesses LAC (1) with PPPoE (registered trademark), the PPPoE session ID 1211 is included in the PK3 header (FIG. 11). PPPoE is a means for implementing user authentication and other PPP functions on the Ethernet (registered trademark), and establishes a PPPoE session to perform PPPoE communication between the host and LAC (1). The PPPoE session is implemented when LAC sends a PPPoE session ID to the host, so that the PPPoE session ID can be an ID used for uniquely identifying a subscriber or a host.

How the LAC user management table is created will be described next. If host H-1 makes a request to access the Internet with user ID xxxx@ISP1, the L2TP tunnel processing block 413 and the L2TP session processing block 412 of LAC (1) search the user information table 421 for a destination LNS address, using xxxx@ISP1 as a search key. After an L2TP session with the destination LNS is established, the L2TP session processing block 412 instructs the protocol processing block 10-i to create subscriber information in the LAC user management table 121, by combining the PPPoE session ID 1 used by host H-1 with xxxx@ISP1 and the destination LNS address 4213, the flow threshold level 4214, and the priority level 4215 corresponding thereto in the user information table 421. Accordingly, when a packet is received from a host, the protocol processing block 10 can obtain the flow threshold level 1213 and the priority level 1214 specified for the subscriber, by searching the LAC user management table 121 using the PPPoE session ID in PK3.

FIG. 12 is a view showing an example of the LNS user management table 122. The table contains a destination LAC address 1222 to which an L2TP tunnel and an L2TP session are connected and a flow threshold level 1223 and a priority level 1224 specified for each subscriber, in correspondence with a pre-encapsulation DA 1221, which is an ID used to identify the subscriber in LNS.

The ID used to identify a subscriber in LNS (2) is an ID used to identify the subscriber in LNS (2) after an L2TP session is established. To be more specific, the ID becomes DA in the IP2 header in PK1.

The LNS user management table is created when LNS (2) establishes an L2TP tunnel and an L2TP session. For instance, when host H-1 makes a request to access the Internet with user ID xxxx@ISP1, the L2TP tunnel processing block 413 and the L2TP session processing block 412 of LNS (2) search the user information table 421 using xxxx@ISP1 as a search key, in order to perform user authentication. When the session is established, an IP address (215.10.10.1, for instance) assigned to host H-1 is known from the information in the packet. The L2TP session processing block 412 instructs the protocol processing block 10-i to create subscriber information in the LNS user management table 122, by combining the IP address 215.10.10.1 used by xxxx@ISP1 of host H-1, the flow threshold level 4214 and the user priority level 4215 in the user information table 421, and the destination LAC address 1222 to which the L2TP session is established. Now, the LNS user management table 122 is created in the memory 107 of the protocol processing block 10. When a downstream packet from Internet NW3 to a host is received, the protocol processing block 10 can obtain the flow threshold level 1223 and the priority level 1224 specified for the corresponding subscriber, by searching through the LNS user management table 122 using DA in the IP2 header in PK1.

FIG. 13 is a view showing an example of the path management table 123.

With reference to the figure, the path management table 123 will be described next in further detail. The path management table is searched when the packet transfer control block 111 determines a packet transfer path.

The path management table contains the information of a possible transfer path to a destination. The shown table uses a destination subnet to represent a destination. The destination subnet is the address of a network containing the destination apparatus. The table includes a DA after L2TP encapsulation (DA in the IP1 field of PK2), a default communication path 1232 to the DA, a path number 1233 used as a path index, a metric value 1234 of each path, output channel information 1235 indicating the output channel interface, physical port number, and others, and router addresses 1236-1, 1236-2, ... 1236-i included in each path.

The table is created when router addresses and a metric value pertaining to each path are obtained as a result of the OSPF protocol processing performed by the path management processing block 414 of the control block 40 and when the control block 40 gives the protocol processing block 10-i an instruction to store the path information.

A transfer path shown in FIG. 13 is selected by specifying router addresses pertaining to the path in a source routing option. If all the router addresses pertaining to a path are specified, strict source routing is executed. If some of the router addresses are specified, loose source routing is executed.

3. Operation 3.1 Operation of the Packet Transfer Apparatus

The processing performed by the blocks in the protocol processing block 10 will be described next.

If the present packet transfer apparatus is operating as LAC (1), the packet flow monitoring block 114 obtains the flow threshold level 1213 and the priority level 1214 from the LAC user management table 121 (FIG. 11), using the PPPoE session ID included in the header of PK3, for instance, and measures and compares the actual packet flow with the flow threshold level. The comparison of flow is made for each subscriber. The amount of packet flow is calculated, for instance, by providing a reception byte counter for each subscriber on the memory, counting up the length of each received packet, and reading the byte counter periodically.

The packet flow obtained as described above is checked to see whether the preselected flow threshold level is exceeded, and the result is sent to the packet transfer control block 111.

If the packet transfer apparatus is operating as LNS (2), the flow threshold level and the priority level are obtained from the LNS user management table 122 (FIG. 12) by using DA included in the IP1 header of PK1, for instance. The other operation is the same as that when the apparatus is operating as LAC (1).

The packet transfer control block 111 will be described next. The packet transfer control block determines an actual packet transfer path, in accordance with the result of packet flow monitoring described above, the priority levels 1214 and 1224 obtained from the LAC user management table 121 and the LNS user management table 122, and the search result of the path management table 123. The packet transfer control block also adds a source routing option, which is an IP option. The packet transfer control block 111 implements a priority policy used to select a path in accordance with the priority level. The priority policy depends on how a path is selected in accordance with the priority level.

The priority policy is a type of processing performed to select a path when a plurality of paths is possible for a destination subnet. For one priority policy, a path having a medium metric value (a path having a medium transfer rate among the plurality of paths) may be specified as a default communication path in the path management table 123. If the packet flow of a user having a high priority level exceeds the threshold level, a path having a lower metric value (a higher transfer rate) than the default path may be selected.

For another priority policy, a path having the lowest metric value (a path having the highest transfer rate) may be specified as a default communication path in the path management table 123. If the packet flow of a user having a high priority level exceeds the threshold level, the packet transfer path of a user having a lower priority level may be switched to a path having a higher metric value (a lower transfer rate) than the default communication path.

The protocol processing block 10 also has the L2TP encapsulation block 112, the L2TP decapsulation block 113, and the output header affixation block 115.

The L2TP encapsulation block 112 performs L2TP encapsulation from PK1 to PK2 when the present packet transfer apparatus is operating as LAC (1) or from PK3 to PK2 when the present packet transfer apparatus is operating as LNS (2).

The L2TP decapsulation block 113 performs L2TP decapsulation from PK2 to PK1 when the present packet transfer apparatus is operating as LAC (1) or from PK2 to PK3 when the present packet transfer apparatus is operating as LNS (2).

The output header affixation block 115 adds a header corresponding to the type of the output channel, such as Ethernet or ATM, when the present packet transfer apparatus outputs a packet. This processing is executed by the protocol processing block 10-*i* on the output side.

3.2 Operation of LAC

Figure 16:
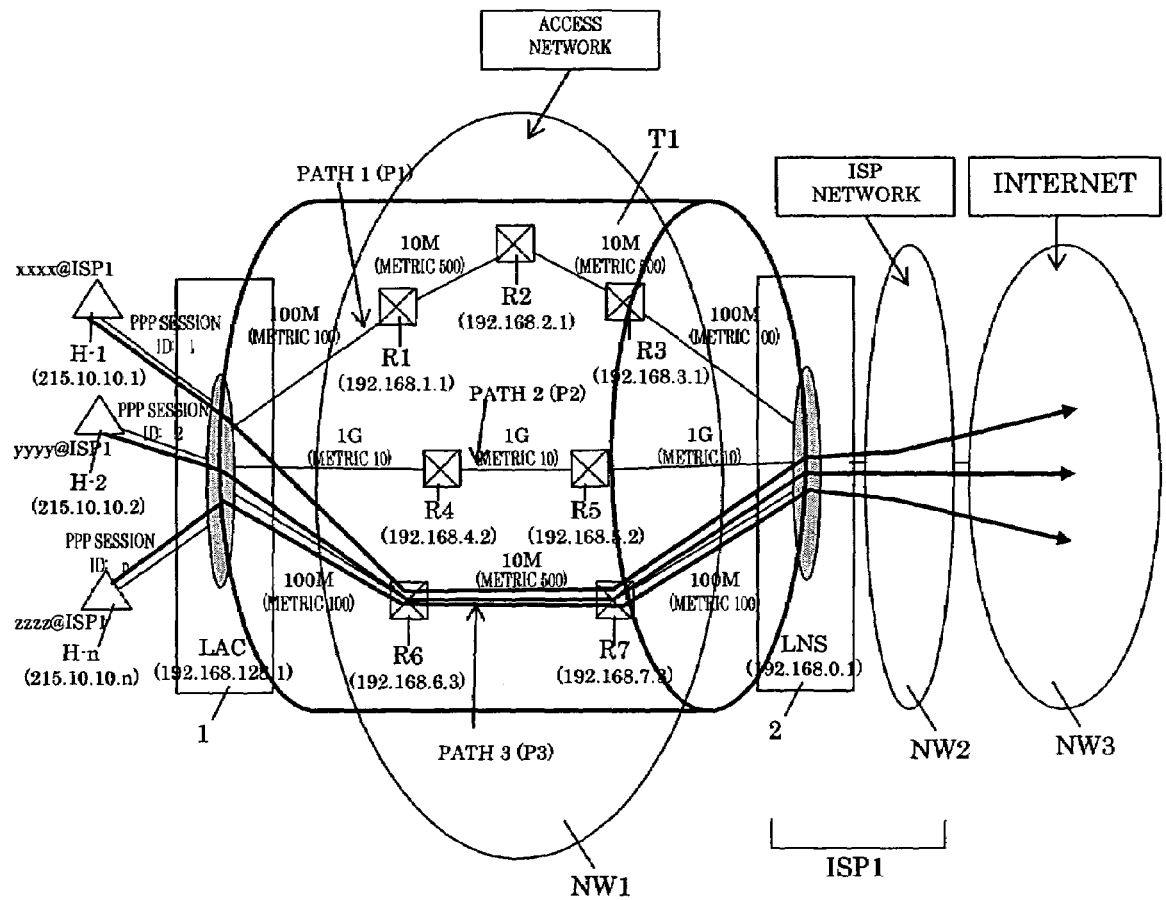
FIG. 16 is a view showing a communication system configuration before a packet transfer path is switched.
Figure 17:
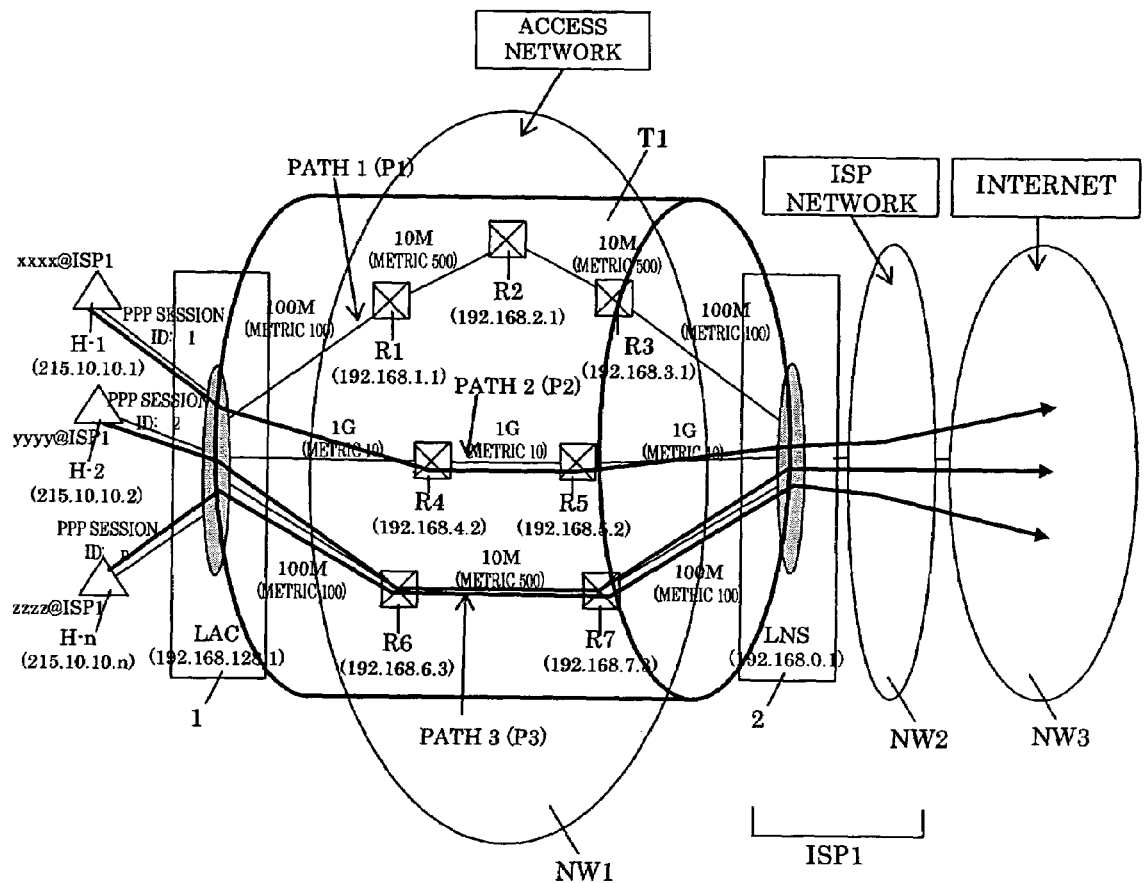
FIG. 17 is a view showing a communication system configuration after the packet transfer path is switched.
Figure 18:
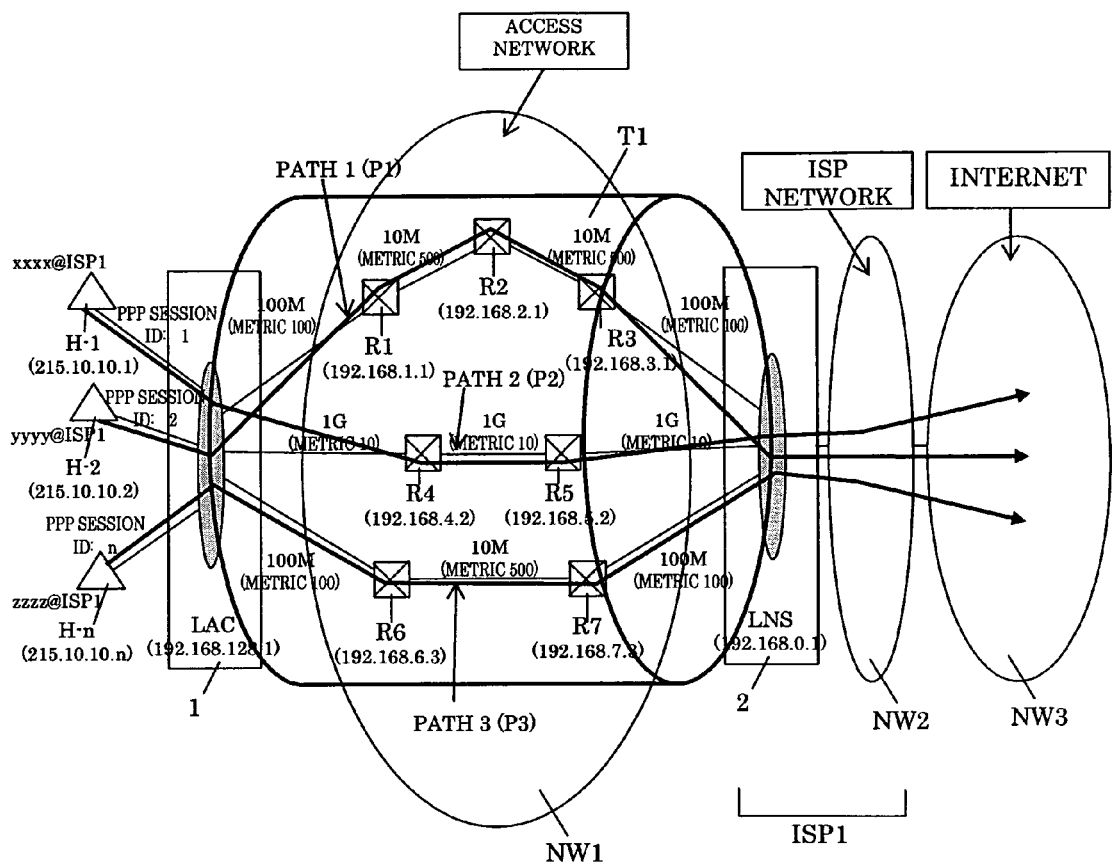
FIG. 18 is a view showing another communication system configuration after another packet transfer path is switched.

FIG. 16 is a view showing a communication system configuration before a packet transfer path is switched. FIGS. 17 and 18 are views showing communication system configurations after packet transfer paths are switched. The operation to switch a transfer path from the state shown in FIG. 16 to the state shown in FIG. 17, and further another transfer path from the state shown in FIG. 17 to the state shown in FIG. 18 will be described next.

Figure 5:
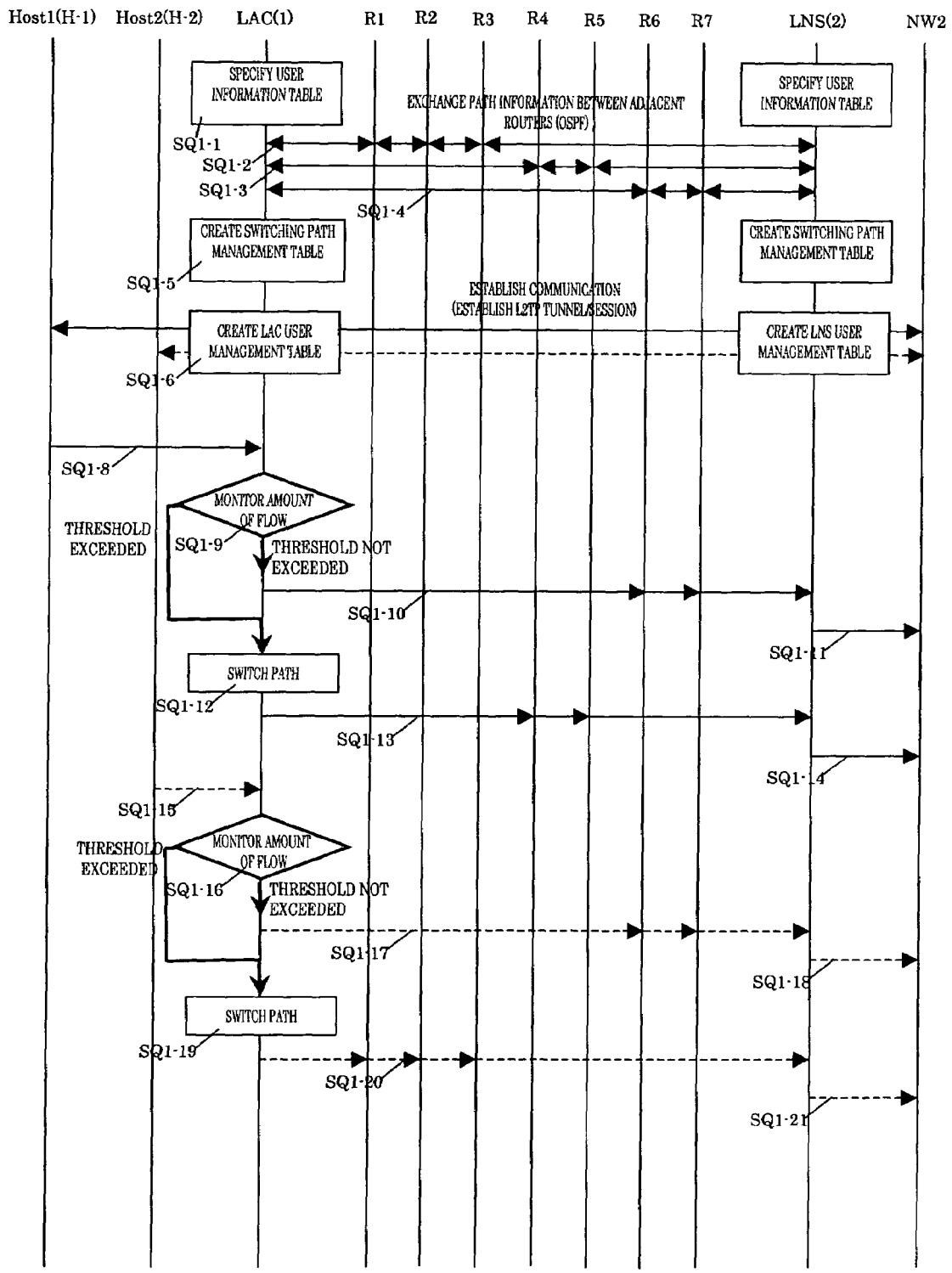
FIG. 5 is a view showing a path switching sequence in packet transfer from a terminal to the Internet when a packet transfer apparatus of the present invention is used.

FIG. 5 shows a sequence of switching a transfer path while the present packet transfer apparatus is operating as LAC (1).

In step SQ1-1, the apparatus manager creates a user information table (FIG. 14) and specifies a flow threshold level and a priority level of each user.

In steps SQ1-2 to SQ1-4, the apparatus starts up, exchanges path information including metric values with adjacent routers by the OSPF protocol, and obtains the information of the configuration of access network NW1. The information indicates, for instance, that NW1 contains LAC (1), LNS (2), and R1 to R7, and also includes the metric values of channels connecting those apparatuses. In step SQ1-5, a path management table 123 (FIG. 13) is created.

The path management table 123 (FIG. 13) stores the information of all possible paths to a destination subnet, as described earlier.

If the destination is LNS (2) for terminating L2TP and if the address is 192.168.0.1, the information of three paths P1, P2, and P3 to the destination is stored after the OSPF protocol is executed. For instance, the information of path P1 to be stored includes the following: included router addresses 1236-1, 1236-2, and 1236-3, a total metric value 1234, and corresponding output channel information 1235 used to output a packet to the path, all shown in FIG. 13. In the shown example, the address of router R1 is 192.168.1.1; the address of router R2 is 192.168.2.1; the address of router R3 is 192.168.3.1; the metric value is 1200 (=100+500+500+100).

The output channel information is the information of a channel to which the present apparatus outputs a packet. The control block 40 specifies an output channel interface and a physical port of each path. For instance, output channel interface number 5 and physical port number 3 are specified for path P1. If there is a plurality of paths to a destination, a default packet transfer path 1232 is also specified in the path management table 123 in accordance with the priority policy implemented by the path management processing block 414, which will be described later, of the control block 40.

Described next will be the operation of the present apparatus when the path information is stored in the path management table 123 in step SQ1-5.

When the apparatus receives an OSPF packet, the protocol processing processor 101 of the protocol processing block 10-*i* detects and transfers the OSPF packet to the control block 40. The path management processing block 414 executed by the processor 401 in the control block 40 performs the OSPF processing.

When the apparatus sends path information to adjacent routers R1, R4, and R6, the path management processing block 414 generates an OSPF packet and sends the packet through the protocol processing block 10-*i* and the channel interface 30-*i*.

After the information of access network NW1 such as metric values and router addresses is obtained through the exchange of path information among adjacent routers, the processor 401 of the control block 40 gives the protocol processing processor an instruction to create the path management table 123 accordingly (SQ1-5). In the meantime, the path management processing block 414 specifies the default path 1232, but the default path is determined in accordance with the priority policy implemented by the apparatus. Besides the path management tunnel processing block 414 of the control block 40, the packet transfer control block 111 of the protocol processing block 10-*i* implements the priority policy.

The priority policy correlates a path selection method with the priority level specified in step SQ1-1. An example policy that can be applied is like this: If the packet flow of a subscriber having a high priority level exceeds the threshold level, a path having a higher rate than the default path is selected; If the packet flow of a subscriber having a low priority level exceeds the threshold level, a path having a lower rate than the default path is selected.

In this embodiment, three priority levels 1, 2, and 3 are defined, and the priority policy described above is adopted. Priority level 1 is the highest, and priority level 3 is the lowest.

The metric value used in OSPF is used as a measure of a transfer rate. A high metric value indicates a low rate, and a low metric value indicates a high rate. Among the three paths to 192.168.0.1, shown in FIG. 13, path P3 having a medium metric value of 700 is specified as the default path.

The operation after a host terminal H-1, H-2, or H-n makes a request to access Internet NW3 by the PPP protocol will be described next.

The operation performed when the LAC user management table is created in step SQ1-6 will be described.

If host H-1 makes a request to access Internet NW3 using user ID xxxx@ISP1, for instance, the apparatus follows the PPP connection procedure and the L2TP connection procedure to establish an L2TP tunnel and an L2TP session as before. In the meantime, LAC (1) creates the LAC user management table 121 (SQ1-6) by correlating the subscriber ID used to identify the user to the flow threshold level and the priority level defined for each user in the user information table 421 (FIG. 14). If the subscriber uses PPPoE, the subscriber ID used to identify the user in LAC (1) is a PPPoE session ID included in the PPPoE header.

The operation of the apparatus in step SQ1-6 will be described next in further detail.

When a packet of PPP session establishment request and a packet of L2TP session establishment request are received, the protocol processing block 10-*i* detects and transfers the packets to the control block 40. The PPP connection processing block 411, the L2TP tunnel processing block 413, and the L2TP session processing block 412 in the control block 40 handle the packets, and then the host is allowed to access the Internet.

In the meantime, the control block 40 searches the user information table 421 (FIG. 14) for the destination of the L2TP tunnel and the L2TP session, which the user having user ID xxxx@ISP1 requires to access the Internet. At the same time, the control block 40 obtains the flow threshold level and the priority level defined for the user. The control block 40 gives the protocol processing processor 101 an instruction to correlate the PPPoE session ID assigned to xxxx@IPS1 (1, in the example shown in FIG. 11) with the items obtained from the user information table 421 (a flow threshold level of 1 Mbit/s and priority level 1, in the example shown in FIG. 14) and to store the information in the LAC user management table 121 (FIG. 11).

If another host H-2 or H-n makes a request to access the Internet, the information of the subscriber (PPPoE session ID 2 or n) is stored in the LAC user management table 121, in the same manner as described above.

In step SQ1-8, host H-1 starts accessing Internet NW3. When a packet is sent, the protocol processing block 10-i receives the packet through the channel interface 30-i. In the protocol processing processor 101 of the protocol processing block 10-i, the packet flow monitoring block 114 first searches through the LAC user management table 121 (FIG. 11) by using PPPoE session ID 1, and obtains the flow threshold level 1213 and the priority level 1214.

In step SQ1-9, the packet flow monitoring block 114 measures the packet flow and compares the measured value with the flow threshold level obtained above.

If the comparison of the packet flow indicates that the measured flow is not exceeding the flow threshold level, the packet is transferred in step SQ1-10. The operation in the step will be described next.

If the measured flow is lower than a flow threshold level of 1 Mbit/s specified for xxxx@ISP1, the L2TP encapsulation block 112 adds headers for L2TP tunnel T1 such as the L2TP header and the IP1 header of PK2, and others. DA of the IP1 header is the address of LNS (2) terminating L2TP tunnel T1, which is 192.168.0.1 in this embodiment.

After the L2TP encapsulation is completed, the packet transfer control block 111 performs packet transfer control, or the processing to determine a packet transfer path. The path management table (FIG. 13) is searched through by using a DA of 192.168.0.1 in the IP header. Three paths P1, P2, and P3 obtained by the OSPF protocol described above are listed as candidates of the transfer path.

When the packet is received, the packet flow does not exceed the threshold level, so that the default path 1232 is selected. The default path to 192.168.0.1 is path P3, so that the packet transfer control block 111 selects physical port 2 of channel interface 3 as the output channel of packet transfer to path 3, and transfers the packet through the switch to the protocol processing block 10 corresponding to channel interface 3.

The protocol processing block 10 on the channel interface side adds a header corresponding to the output channel. If the output channel corresponding to physical port 2 of channel interface 3 is Ethernet (registered trademark), the packet is given an Ethernet header in which the MAC address of router R6 is specified as the destination MAC address and the MAC address of the output port is specified as the source MAC address. Now, the packet is output from LAC (1) to path P3 in step SQ1-10.

If the comparison of the packet flow in step SQ1-9 indicates that the measured flow is exceeding the flow threshold level, the apparatus switches the packet transfer path from the default path to another path in step SQ1-12. The operation of the apparatus in this step will be described next.

The packet transfer control block 111 searches the path management table 123 (FIG. 13) for a transfer path to 192.168.0.1, as in step SQ1-10. The OSPF protocol lists three paths P1, P2, and P3 as candidates for the transfer path, as described earlier. Because the flow threshold level is exceeded, a path is selected in accordance with the priority policy implemented in the packet transfer control block 111.

By the priority policy applied here, when the packet flow of a subscriber having a high priority level exceeds the threshold level, the default path is switched to a faster path. Because the earlier search through the LAC user management table indicates that the priority level of xxxx@ISP1 is 1 (high priority), when the packet flow of the subscriber exceeds the threshold level, the packet transfer control block 111 selects a path faster than the default path, or a path having a lower metric value, from the path management table 123 (FIG. 13). Because default path P3 has a metric value of 700, path P2 having a metric value of 30 is selected as the transfer path, and path switching starts.

In path switching, the source routing option is added to IP1 of the IP header of PK2 (FIG. 2) after L2TP encapsulation, and the router addresses corresponding to path number 2 are specified.

Figure 15:
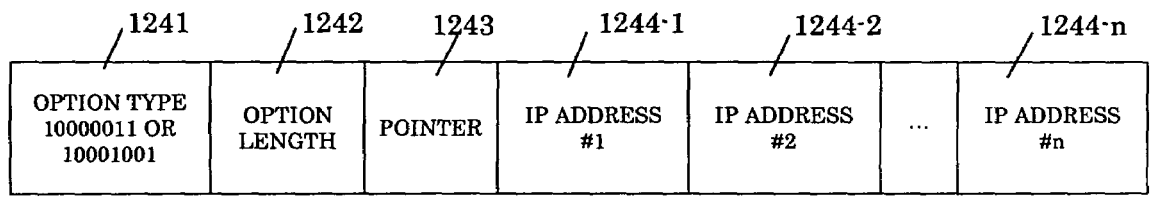
FIG. 15 is a view showing the format of a source routing option in the IP header.

FIG. 15 shows the format of the source routing option. An option type 1241 indicates whether loose source routing or strict source routing is selected. When this field is set to "10000011", loose source routing is selected. When this field is set to "10001001", strict source routing is selected. IP address #1 1244-1 to IP address #n 1244-n indicate the addresses of routers through which packets are transferred. An option length 1242 indicates the length of this option. A pointer 1243 indicates the position of the IP address field of the very next router to which the packets are transferred.

Strict source routing is selected in this embodiment. If path P2 is selected, the packet transfer control block 111 specifies IP address #1 1244-1 to the address of router R4, 192.168.4.2, and IP address #2 1244-2 to the address of router R5, 192.168.5.2. The option type, the option length, and the pointer are specified accordingly.

Then, the packet transfer control block 111 performs transfer through the switch to the protocol processing block 10 corresponding to channel interface 2, which is the output destination of path P2.

The protocol processing block 10 on the output side adds an output header for physical port 1 of channel interface 2, and transfers the packet in step SQ1-13.

The source routing option causes the packet to be routed through routers R4 and R5 to LNS (2), in path P2 of path number 2.

The packets from hosts H-1, H-2, and H-n are transferred in the paths shown in FIG. 17.

Next described with reference to FIG. 5 will be the sequence of operation of the apparatus to which the same priority policy as described above is applied in the configuration shown in FIG. 1, when the packet flow of a user having a low priority level exceeds the threshold level.

In step SQ1-15, host H-2 sends a packet toward Internet NW3. In step SQ1-16, the packet flow is monitored. The operation of the apparatus before flow monitoring is the same as when host H-1 with user ID xxxx@ISP1 sends a packet toward Internet NW3.

If the result of flow monitoring indicates that a flow threshold level of 2 Mbit/s specified for user ID yyyy@ISP1 used by host H-2 is exceeded, the transfer path is switched.

The priority policy applied here specifies that when the packet flow of a subscriber having a low priority exceeds the threshold level, the default path is switched to a slower path. Because the priority level of yyyy@ISP1 obtained from the LAC user management table 421 is 3 (low priority), when the packet flow of yyyy@ISP1 exceeds the threshold level, the packet transfer control block 111 selects a path slower than the default path, that is a path having a higher metric value, from the path management table 123 (FIG. 13). Because the metric value of default path P3 is 700, path P1 having a metric value of 1200 is selected as the transfer path, and path switching starts.

In path switching, the IP addresses of routers pertaining to path P1 are specified in the source routing option: address 192.168.1.1 of router R1 in IP address #1 1244-1, address 192.168.2.1 of router R2 in IP address #2 1244-2, and address 192.168.3.1 of router R3 in IP address #3 1244-3. The packet is transferred through the switch to the protocol processing block 10 corresponding to the output channel interface having channel interface number 5.

The subsequent part of the operation is the same as when host H-1 having user ID xxxx@ISP1 sends a packet toward Internet NW3.

The source routing option causes the output packet to be routed through routers R1, R2, and R3 to LNS (2), in path P1 having path number 1.

Packets from hosts H-1, H-2, and H-n are routed as shown in FIG. 18.

3.3 Operation of LNS

Figure 6:
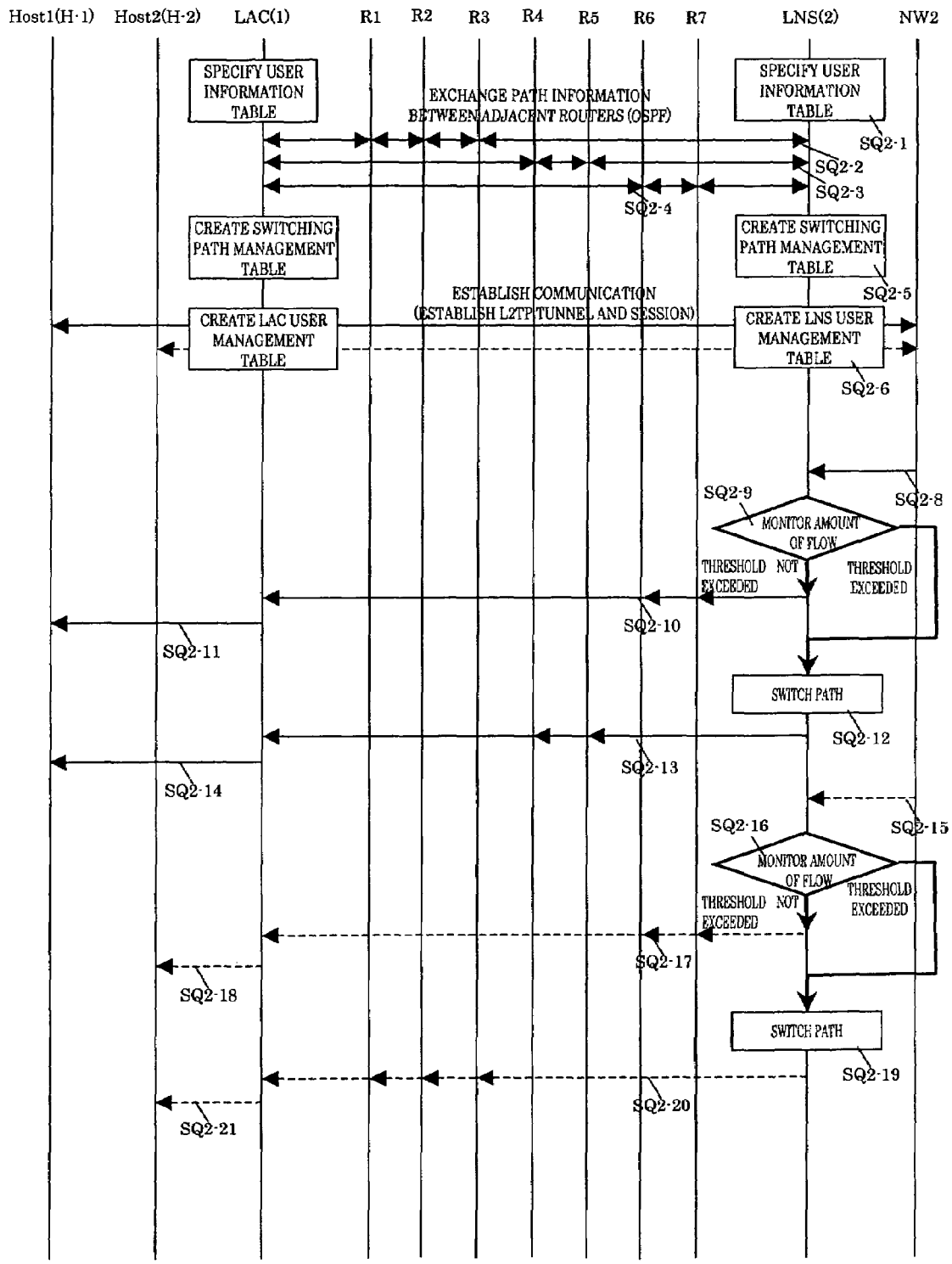
FIG. 6 is a view showing a path switching sequence in packet transfer from the Internet to a terminal when the packet transfer apparatus of the present invention is used.
Figure 7:
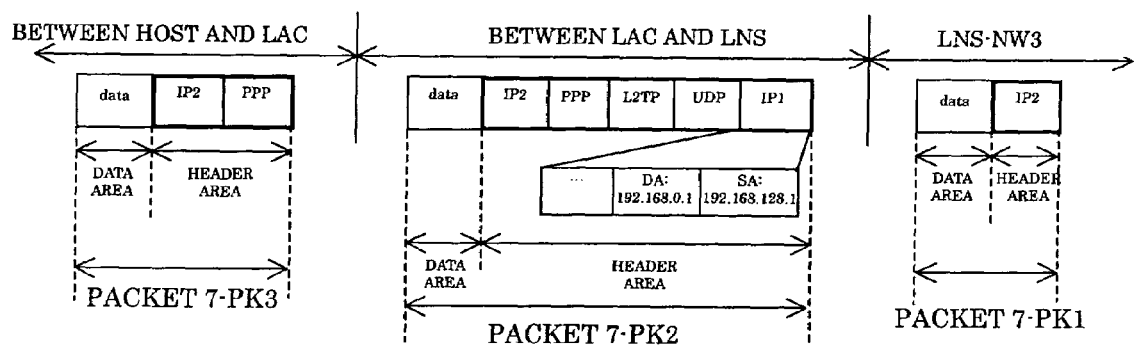
FIG. 7 is a view showing packet formats used in the configuration shown in FIG. 3.

FIG. 6 shows a sequence of switching a transfer path when the apparatus of the present invention is operating as LNS (2).

The apparatus operating as LNS (2) switches a packet transfer path in the direction from Internet NW3 to a host H-1, H-2, or H-n.

The operation of the apparatus as LNS (2) differs from the operation of the apparatus as LAC (1) in that the LNS user management table 122 is used instead of the LAC user management table 121. In this embodiment, a packet of a user is recognized by DA in the IP2 header, as shown in FIG. 2. That is, DA in the IP2 header before encapsulation by the L2TP header or the IP1 header is used. More specifically, the IP address assigned to the host is used. That is, a packet of host H-1 is recognized as a packet having a DA of 215.10.10.1 in the IP2 header.

The other part of the operation is the same as that when the apparatus operates as LAC (1).

In step SQ2-1, the user information table 421 is created, as when the apparatus is operating as LAC (1).

In steps SQ2-2 to SQ2-4, the apparatus operating as LNS (2) exchanges path information including metric values with adjacent routers by the OSPF protocol, as when the apparatus is operating as LAC (1). In step SQ2-5, the path management table 123 (FIG. 13) is created.

The apparatus stores path information in the path management table 123. The description of the operation will be omitted because the operation is the same as when the apparatus is operating as LAC (1).

In step SQ2-6, a host terminal H-1, H-2, or H-n makes a request to access Internet NW3, using the PPP protocol, and the apparatus creates the LNS user management table 122.

If host H-1 makes a request to access Internet NW3, using user ID xxxx@ISP1, for instance, LAC (1) gives the present apparatus operating as LNS (2) a request to establish an L2TP tunnel and an L2TP session. In response to the request, when the L2TP tunnel and the L2TP session are established, the apparatus creates an LNS user management table 122 by correlating the subscriber ID which LNS (2) uses to identify the user to the flow threshold level and the priority level of the user defined in the user information table 421 (FIG. 14). LNS (2) recognizes a user by using DA in the IP header before L2TP encapsulation as a subscriber ID. DA of host H-1 is 215.10.10.1, for instance.

The description of the operation to create the LNS user management table 122 will be omitted because the operation is the same as the operation to create the LAC user management table 121.

After the L2TP tunnel and the L2TP session are established, when a packet is sent from Internet NW3 toward host H-1, the protocol processing block 10-*i* in the apparatus receives the packet through the channel interface 30-*i*. The protocol processing processor 101 of the protocol processing block 10-*i* starts the packet flow monitoring block 114. Because the apparatus is operating as LNS (2), the packet flow monitoring block 114 searches through the LNS user management table (FIG. 11), using DA in the IP header before the L2TP encapsulation, and obtains the flow threshold level 1213 and the priority level 1214.

In step SQ2-9, the packet flow monitoring block 114 of the apparatus starts flow monitoring. The operation of the packet flow monitoring block 114 is the same as the operation when the apparatus is operating as LAC (1).

If the packet flow monitoring block 114 finds that the measured flow is not exceeding the flow threshold, the packet is transferred in access network NW1 in step SQ2-10. If the measured flow exceeds the flow threshold, the apparatus switches the path in step SQ2-12, and the packet is transferred accordingly in access network NW1 in step SQ2-13.

The operations of the apparatus to determine the transfer path and to output the packet are the same as the operations of LAC (1) and will not be described here.

In step SQ2-15, the apparatus operating as LNS (2) receives a packet sent from Internet NW3 toward host H-2. In step SQ2-16, the packet flow monitoring block 114 performs flow monitoring for the packet received by the apparatus. If the measured flow is not exceeding the flow threshold level, the packet is transferred in access network NW2 in step SQ2-17. If the measured flow is exceeding the flow threshold level, the apparatus switches the path in step SQ2-19, and the packet is transferred accordingly in access network NW2 in step SQ2-20.

The description of operations in steps SQ2-15 to SQ2-20 will be omitted because the operations are the same as those when the apparatus is operating as LAC.

The apparatus operating as LNS (2) allows the packet transfer path to be switched dynamically as described above.

4. Modified Embodiment

An apparatus other than the apparatus of the present invention may have the user information table 421 (FIG. 14). For instance, the table may be provided in a Radius server, which is a server performing collective information management for user authentication, in access network NW1. The remote authentication dial in user service (RADIUS) protocol, as defined in RFC 2869, is used between the apparatus and the Radius server.

The user information table 421 (FIG. 14) in the Radius server is specified by a maintenance person in step SQ1-1 shown in FIG. 5.

If the apparatus is operating as LAC (1), when host H-1, H-2, or H-n makes a request to access Internet NW3, the apparatus accesses the Radius server to obtain the address of LNS to which an L2TP session and an L2TP session are established in step SQ1-6. The apparatus obtains the flow threshold level 4214 and the priority level 4215 of each subscriber from the Radius server and creates the LAC user management table 121.

Operations in step SQ1-8 and the subsequent steps are the same as those of the apparatus operating as LAC (1).

The user information table 421 (FIG. 14) in the Radius server is specified by the maintenance person in step SQ2-1, as shown in FIG. 6.

If the apparatus is operating as LNS (2), when host H-1, H-2, or H-n makes a request to access Internet NW3, the apparatus accesses the Radius server to perform user authentication for establishing an L2TP session and an L2TP session in step SQ2-6. The apparatus obtains the flow threshold level 4214 and the priority level 4215 of each subscriber from the Radius server, and creates the LNS user management table 122.

Operations in step SQ2-8 and the subsequent steps are the same as those of the apparatus operating as LNS (2).

The present invention can be applied to packet transfer apparatuses such as a subscriber-side L2TP terminating apparatus (LAC) and an ISP-side L2TP terminating apparatus (LNS), for instance.

What is claimed is:

1. A packet transfer apparatus for serving a plurality of communication terminals having IP addresses and for connecting the communication terminals through a Layer 2 Tunneling Protocol (L2TP) network to the Internet, the packet transfer apparatus comprising:

a protocol processing block for specifying a priority policy for associating a priority level with a path selection method and for selecting one of a plurality of physical paths formed by a plurality of routers in the L2TP network;

a plurality of channel interfaces for transferring a received packet to the protocol processing block and for sending the packet received from the protocol processing block in a communication protocol used on an input/output channel;

a switch for transferring the packet received from the protocol processing block to another protocol processing block connected to the channel interface containing an output port having a given address;

a user information table for specifying a destination address of an L2TP tunnel and an L2TP session, a flow threshold level, and a priority level, in correspondence with a user ID of a user using a communication terminal; and a path management table for storing a path identifier of each path to a destination subnet address, addresses of routers included in each path, and a metric value representing the proximity to a destination subnet or the transfer rate of each path;

wherein the protocol processing block creates a user management table storing the destination addresses of the L2TP tunnels and the L2TP sessions, the flow threshold levels, and the priority levels of the users defined in the user information table, in correspondence with identifiers for identifying the individual users, when the L2TP tunnel and the L2TP session are established;

detects the amount of packet flow of each user in accordance with the identifier for identifying the user at the reception of a packet from the channel interface, and compares the amount of packet flow with the flow threshold level defined in the user management table;

selects a transfer path in accordance with a priority policy for switching a default path to another path having a different metric value, depending on the priority level, with reference to paths defined for the corresponding destination subnet address in the path management table, if the amount of packet flow exceeds the flow threshold level; and adds a source routing option for specifying addresses of routers to be passed, as indicated in the path management table, to the data received from the communication terminal, performs L2TP encapsulation for adding a header used in the L2TP tunnel, and switches a physical path by specifying destination routers.

2. A packet transfer apparatus according to claim 1, wherein the priority policy determines that the default path is switched to a faster path having a lower metric value if the amount of packet flow of a user having a high priority exceeds the threshold level and that the default path is switched to a slower path having a higher metric value if the amount of packet flow of a user having a low priority exceeds the threshold level.

3. A packet transfer apparatus according to claim 1, wherein the path management table specifies a path having a medium metric value as the default communication path.

4. A packet transfer apparatus according to claim 1, wherein, if a packet flow comparison indicates that the measured amount of packet flow does not exceed the flow threshold level, the protocol processing block performs L2TP encapsulation for adding a header used in the L2TP tunnel, selects the default path with reference to the path management table, adds the source routing option, and transfers packets.

5. A packet transfer apparatus according to claim 1, wherein the source routing option includes a data item indicating either loose source routing, in which a different router can be passed before the next router specified in the option, or strict source routing, in which routers having specified addresses must be passed in the specified order, is performed.

6. A packet transfer apparatus according to claim 1, wherein the user management table for LAC, which stores the flow threshold levels and the priority levels of the individual users defined in the user information table in correspondence with individual PPPoE session IDs for identifying the users, is created when the L2TP tunnel and the L2TP session are established, if the apparatus operates as a subscriber-side L2TP terminating apparatus (LAC); and the packet processing block obtains the flow threshold level and the priority level corresponding to each PPPoE session ID with reference to the user management table.

7. A packet transfer apparatus according to claim 1, wherein the user management table for LNS, which stores the flow threshold levels and the priority levels of the individual users defined in the user information table in correspondence with the destination IP address used by a communication terminal before L2TP encapsulation, is created when the L2TP tunnel and the L2TP session are established, if the apparatus operates as an Internet-service-provider-side L2TP terminating apparatus (LNS); and the packet processing block obtains the flow threshold level and the priority level corresponding to a destination IP address, with reference to the user management table.

* * * * *